United States Patent
Pyati et al.

(10) Patent No.: US 10,877,810 B2
(45) Date of Patent: Dec. 29, 2020

(54) OBJECT STORAGE SYSTEM WITH METADATA OPERATION PRIORITY PROCESSING

(71) Applicant: Western Digital Technologies, Inc., San Jose, CA (US)

(72) Inventors: Ameet Pyati, Bangalore (IN); Muhammad Tanweer Alam, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 145 days.

(21) Appl. No.: 16/147,576

(22) Filed: Sep. 29, 2018

(65) Prior Publication Data

US 2020/0104181 A1    Apr. 2, 2020

(51) Int. Cl.
```
G06F 15/16       (2006.01)
G06F 9/50        (2006.01)
H04L 29/08       (2006.01)
G06F 16/22       (2019.01)
G06F 16/16       (2019.01)
G06F 16/23       (2019.01)
G06F 16/2457     (2019.01)
G06F 3/06        (2006.01)
```
(52) U.S. Cl.
CPC .......... G06F 9/5038 (2013.01); G06F 3/067 (2013.01); G06F 3/0659 (2013.01); G06F 16/164 (2019.01); G06F 16/22 (2019.01); G06F 16/2358 (2019.01); G06F 16/24573 (2019.01); H04L 67/1097 (2013.01)

(58) Field of Classification Search
CPC ...... G06F 9/5038; G06F 16/22; G06F 16/164; G06F 16/2358; G06F 16/24573; G06F 3/067; G06F 3/0659; G06F 9/4881; H04L 67/1097; H04L 67/322
USPC .......................... 709/201, 223, 224; 718/103
See application file for complete search history.

(56) References Cited

U.S. PATENT DOCUMENTS 5,220,653 A * 6/1993 Miro ...................... G06F 3/0601
                                                              718/107
5,530,948 A    6/1996 Islam
(Continued)

OTHER PUBLICATIONS

Hasan, R., et al., A Survey of Peer-to-Peer Storage Techniques for Distributed File Systems, ITCC '05 Proceedings of the International Conference on Information Technology: Coding and Computing (ITCC'05)—Apr. 4, 2005, 9 pages, vol. 02.
(Continued)

*Primary Examiner* — Liang Che A Wang
*Assistant Examiner* — Johnny B Aguiar
(74) *Attorney, Agent, or Firm* — Patent Law Works LLP

(57) ABSTRACT

Example object storage systems and methods provide priority metadata processing. Metadata operations are received in response to change events for at least one data object. The metadata operations may include system operations configured to manage changes to data objects and user-method operations configured to execute user-defined methods using the data objects. System operations are executed with a first priority in response to system operations with the first priority being available for processing. User-method operations are executed with a second priority in response to no metadata operations with the first priority being available for processing.

20 Claims, 8 Drawing Sheets

(56) References Cited

U.S. PATENT DOCUMENTS

| | | | |
|---|---|---|---|
| 5,742,752 | A | 4/1998 | DeKoning |
| 7,571,344 | B2 | 8/2009 | Hughes et al. |
| 7,620,841 | B2 | 11/2009 | Chen et al. |
| 7,680,837 | B2 | 3/2010 | Yamato |
| 7,934,055 | B2 | 4/2011 | Flynn et al. |
| 7,984,328 | B1 | 7/2011 | Coatney |
| 8,289,641 | B1 | 10/2012 | Emami |
| 8,473,648 | B2 | 6/2013 | Chakhaiyar et al. |
| 8,583,853 | B1 | 11/2013 | Lee et al. |
| 9,053,167 | B1* | 6/2015 | Swift ................... G06F 16/27 |
| 9,118,698 | B1 | 8/2015 | Radovanovic |
| 9,438,665 | B1* | 9/2016 | Vasanth ................. H04L 67/10 |
| 9,448,924 | B2 | 9/2016 | Sundaram et al. |
| 9,720,601 | B2 | 8/2017 | Gupta et al. |
| 9,785,480 | B2 | 10/2017 | Kamawat et al. |
| 9,894,141 | B2 | 2/2018 | Hesselink et al. |
| 2005/0114448 | A1 | 5/2005 | Skomra |
| 2005/0149933 | A1* | 7/2005 | Saito ..................... G06F 9/4843 718/100 |
| 2006/0123142 | A1 | 6/2006 | Duncan et al. |
| 2008/0005382 | A1 | 1/2008 | Mimatsu |
| 2008/0034153 | A1 | 2/2008 | Lee et al. |
| 2009/0150605 | A1 | 6/2009 | Flynn et al. |
| 2011/0246996 | A1* | 10/2011 | Tunning ................ G06F 9/4881 718/103 |
| 2012/0284460 | A1 | 11/2012 | Guda |
| 2013/0007183 | A1* | 1/2013 | Sorenson, III ........ G06F 3/0607 709/213 |
| 2013/0073894 | A1 | 3/2013 | Xavier et al. |
| 2014/0101369 | A1 | 4/2014 | Tomlin et al. |
| 2014/0365719 | A1 | 12/2014 | Kuzmin et al. |
| 2016/0070652 | A1 | 3/2016 | Sundararaman et al. |
| 2017/0286237 | A1 | 10/2017 | Condict et al. |
| 2018/0011801 | A1* | 1/2018 | Sengupta ............. G06F 3/0622 |
| 2018/0024964 | A1 | 1/2018 | Mao et al. |
| 2018/0054217 | A1 | 2/2018 | Schwaderer |
| 2018/0276213 | A1* | 9/2018 | Ramamurthy ...... G06F 16/2379 |
| 2019/0188031 | A1* | 6/2019 | Balachandran ....... G06F 9/4818 |

OTHER PUBLICATIONS

Bates, S., Donard: NVM Express for Peer-2-Peer between SSDs and other PCIe Devices,Storage Developer Conference, SNIA Santa Clara, 2015, 18 pages.

Chester, E., Drobo creator announces Transporter, the private cloud storage solution, May 28, 2013, 2 pages, <https://www.bit-tech.net/news/transporter-private-cloud-storage-drobo-cre/1/.

Sun Microsystems, Inc., SCSI Sense Key Error Guide, Part No. 817-5918-10, Feb. 2004, Revision A, 16 pages.

Wikipedia, The Free Encyclopedia, "Key Code Qualifier," retrieved Jul. 10, 2018, 8 pages, <https://en.wikipedia.org/wiki/Key_Code_Qualifier>.

Zhang, J., et al., ParaFS: A Log-Structured File System to Exploit the Internal Parallelism of Flash Devices, 2016 USENIX Annual Technical Conference, Jun. 22-24, 2016, 15 pages, 978-1-931971-30-0.

U.S. Appl. No. 15/722,685, filed Oct. 2, 2017 by O' Krafka et al.

U.S. Appl. No. 15/722,666, filed Oct. 2, 2017 by Bolkhovitin et al.

Hightower, Rick, and Fadi Maalouli. "Analytics with Apache Spark Tutorial Part 2: Spark SQL—DZone Big Data." Dzone.com, Nov. 3, 2015, dzone.com/articles/analytics-with-apache-spark-tutorial-part-2-spark.

Moatti, Yosef & Rom, et al. (2017). Too Big to Eat: Boosting Analytics Data Ingestion from Object Stores with Scoop. https://www.researchgate.net/.

"Using Oracle Cloud Infrastructure Object Storage Classic." Deleting Multiple Objects in a Single Operation, Mar. 28, 2018, https://docs.oracle.com/en/cloud/iaas/storage-cloud/cssto/deleting-multiple-objects-single-operation.html.

"Bulk Delete¶." OpenStack Docs: OpenStack Security Guide, docs.openstack.org/ocata/user-guide/cli-swift-bulk-delete.html.

"Ahluwalia, Gaurav. United States. White Paper. Event Stream Processor as seen by SAP. An evolution of event driven architecture." pp. 1-11.

About the IBM Cloud Storage API. Sep. 28, 2018. https://console.bluemix.net/docs/services/cloud-object-storage/api-reference/about-api.html#about-the-ibm-cloud-object-storage-api.

Object Operations. Sep. 28, 2018. https://console.bluemix.net/docs/services/cloud-object-storage/api-reference/api-eference-objects.html#object-operations.

* cited by examiner

OBJECT STORAGE SYSTEM WITH METADATA OPERATION PRIORITY PROCESSING

TECHNICAL FIELD

The present disclosure generally relates to data storage, and in a more particular example, to object data storage with metadata processing.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

Such large-scale storage systems generally distribute the stored data objects in the object storage system over multiple storage elements, such as for example disk drives, or multiple components such as storage nodes comprising a plurality of such storage elements. Each data object includes the data itself, as well as a variable amount of metadata associated with its globally unique identifier (GUID). Object metadata may include metadata encapsulated in the object, stored in a database, or stored in key value storage. Creation, modification, and deletion of a data object generally involves modification of the associated metadata. Some data object operations may modify object metadata without modifying the underlying data in the object. Metadata processing and related compute resources may be a significant resource constraint on data operations in an object storage system.

Some object storage architectures do not enable users to run user defined filters, map methods, or other methods to access and process the metadata associated with their stored objects. The object owners may manipulate their stored data objects through user applications complying with the object storage systems' application protocol interfaces (APIs), but it may be difficult to run any sort of analytics or similar processing on their accumulated data without first exporting them to another data system or service, such as a big data database. Use of compute resources within the object storage system to implement user-defined method operations without migrating the data may be appealing, but it may raise concerns about processing priority and assuring that user-defined method operations do not interrupt, delay, or create unnecessary overhead for the core object storage functions of the object storage system.

A need exists for enabling user-defined method operations to be executed using object storage system compute resources, while managing these operations to limit disruption of core system operations.

SUMMARY

Various aspects for metadata processing, particularly, priority metadata processing, in object storage systems are described. In an innovative aspect, a system comprises at least one processor, at least one memory coupled to the at least one processor, and a plurality of storage nodes configured to receive and store data objects. A metadata processor is configured to process metadata operations related to change events for at least one data object. The metadata operations include system operations configured to manage changes to data objects in the plurality of storage nodes and user-method operations configured to execute user-defined methods using the data objects in the plurality of storage nodes. The metadata processor executes system operations with a first priority in response to system operations with the first priority being available for processing. The metadata processor executes user-method operations with a second priority in response to no system operations with the first priority being available for processing.

In various embodiments, a system operations processor may be configured to process system operations from an input queue. The system operations processor may be further configured to receive new entries from the input queue for system operations. A user-method operations processor may be configured to process user-method operations from a data log. The user-method operations processor may be further configured to receive log entries from the data log in response to an input queue being empty. A metadata streamer may be configured to forward metadata operations to an input queue of the metadata processor in response to identifying change events related to data objects in the plurality of storage nodes. An operations categorizer may be configured to identify system operations and user-method operations from metadata operations in the input queue, selectively forward system operations to an execution queue, and selectively forward user-method operations to a data log.

In some embodiments, an execution queue may be configured to receive metadata operations for processing. The metadata processor may be further configured to execute metadata operation entries in the execution queue in a sequential first-in-first-out order. The metadata processor may be further configured to add metadata operations with the second priority to the execution queue only if no metadata operations with the first priority are in the execution queue. The metadata processor may be further configured to add metadata operations with the second priority to the execution queue from a data log in response to the execution queue being empty.

In various embodiments, a user input module may be configured to receive a user-defined method request and to parse the user defined method request into at least one user-method operation. A job manager may be configured to submit user-method operations from the user input module to the metadata processor. System operations may include object operations and metadata operations related to user application access to data objects in the plurality of storage nodes from at least one production user application. User-method operations may include metadata queries configured to generate reports related to aggregate features of data objects in the plurality of storage nodes. User-method operations may include at least one of metadata queries, metadata filters, metadata formatting, or system-supported metadata actions. A user may select the user-method operations for processing outside of object operations and metadata operations related to user application access to data objects. The metadata processor may be further configured to store results of user-method operations in a system metadata repository.

In another innovative aspect, a computer-implemented method provides priority metadata processing. Metadata operations are received in response to change events for at least one data object stored in a plurality of storage nodes. The metadata operations include system operations configured to manage changes to data objects in the plurality of storage nodes and user-method operations configured to execute user-defined methods using the data objects in the plurality of storage nodes. System operations are executed with a first priority in response to system operations with the first priority being available for processing. User-method operations are executed with a second priority in response to no system operations with the first priority being available for processing.

In various embodiments, executing system operations with the first priority may include selecting new entries for system operations from an input queue and sending the selected new entries to a system operations processor configured to process system operations from the input queue. Executing user-method operations with the second priority may include selecting log entries from a data log in response to an input queue being empty and sending the selected log entries to a user-method operations processor configured to process user-method operations from the data log. Change events related to data objects in the plurality of storage nodes may be identified. Metadata operations may be forwarded, in response to identified change events, to an input queue of a metadata processor. System operations and user-method operations may be identified from metadata operations in the input queue. System operations may be selectively forwarded to an execution queue and user-method operations may be selectively forwarded to a data log.

In some embodiments, metadata operation entries may be added to an execution queue configured to receive metadata operations for processing. Metadata operations may be executed based on metadata operation entries in the execution queue in a sequential first-in-first-out order. Metadata operation entries may be added to the execution queue for metadata operations with the second priority only if no metadata operations with the first priority are in the execution queue. Adding metadata operation entries to the execution queue for metadata operations with the second priority may be done from a data log in response to the execution queue being empty.

In various embodiments, a user-defined method request may be received, parsed into at least one user-method operation, and submitted to a metadata processor. System operations may include object operations and metadata operations related to user application access to data objects in the plurality of storage nodes from at least one production user application. User-method operations may include metadata queries configured to generate reports related to aggregate features of data objects in the plurality of storage nodes. User-method operations may include at least one of metadata queries, metadata filters, metadata formatting, or system-supported metadata actions. The user-method operations may be selected by a user for processing outside of object operations and metadata operations related to user application access to data objects and results may be stored in a system metadata repository.

In yet another innovative aspect, a system comprises at least one processor and at least one memory coupled to the at least one processor. Means are provided for receiving metadata operations in response to change events for at least one data object stored in a plurality of storage nodes configured to receive and store data objects. The metadata operations include system operations configured to manage changes to data objects in the plurality of storage nodes and user-method operations configured to execute user-defined methods using the data objects in the plurality of storage nodes. Means are provided for executing system operations with a first priority in response to metadata operations with the first priority being available for processing. Means are provided for executing user-method operations with a second priority in response to no metadata operations with the first priority being available for processing.

In some embodiments, means may be provided for identifying change events related to data objects in the plurality of storage nodes. Means may be provided for forwarding metadata operations in response to identified change events to an input queue of a metadata processor. Means may be provided for identifying system operations and user-method operations from metadata operations in the input queue. Means may be provided for selectively forwarding system operations to an execution queue. Means may be provided for selectively forwarding user-method operations to a data log.

The various embodiments advantageously apply the teachings of object storage systems to improve the functionality of such computer systems. The various embodiments include operations to overcome or at least reduce the issues in the previous object storage networks and/or systems discussed above and, accordingly, are more efficient and reliable than other storage networks, while enabling additional user-methods, such as metadata analytics. That is, the various embodiments disclosed herein include hardware and/or software with functionality to improve the processing priority of metadata operations, based on managing prioritization between system operations and user-method operations. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
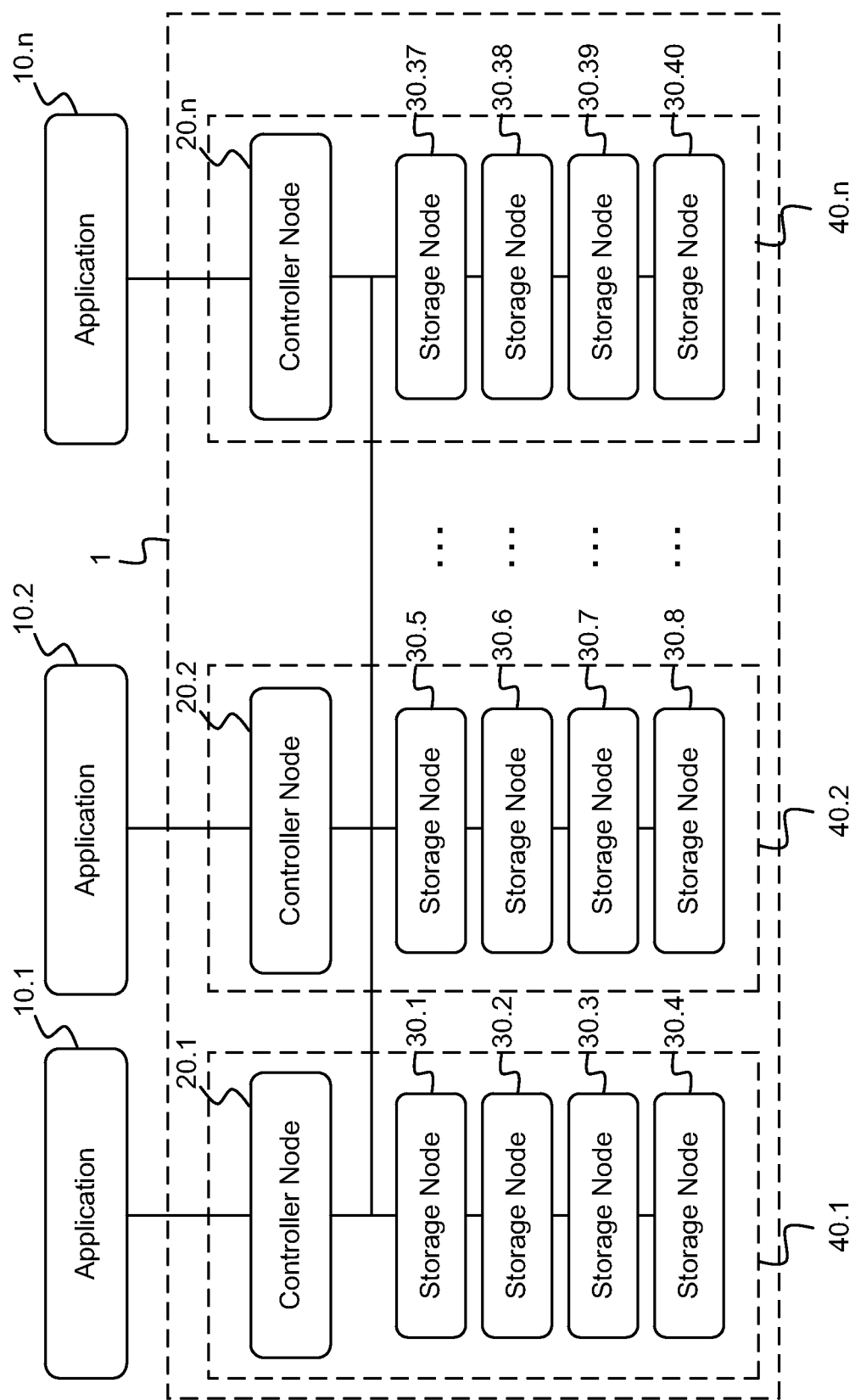
FIG. 1 schematically illustrates an example embodiment of an object storage system.

FIG. 1 shows an embodiment of an example object storage system 1. According to this embodiment the storage system 1 may be implemented as a distributed object storage system which is coupled to one or more applications 10 for transferring and otherwise accessing data objects. The connection between the storage system 1 and the application 10 could, for example, be implemented as a suitable data communication network. Such an application 10 could, for example, be a dedicated software application running on a computing device, such as a personal computer, a laptop, a wireless telephone, a personal digital assistant or any other type of communication device that is able to interface directly with the storage system 1. However, according to alternative embodiments, the application 10 could for example comprise a suitable file system which enables a general purpose software application to interface with the distributed storage system 1, an application programming interface (API) library for the distributed storage system 1, etc.

As further shown in FIG. 1, the storage system 1 comprises at least one controller node 20 and a plurality of storage nodes 30.1-30.40 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Controller nodes 20, storage nodes 30 and the devices hosting application 10 may connect to the data communication network by means of suitable wired, wireless, optical, etc. network connections or any suitable combination of such network connections. Although the embodiment of FIG. 1 shows three controller nodes 20 and forty storage nodes 30, according to alternative embodiments the distributed storage system 1 could comprise any other suitable number of storage nodes 30 and, for example, one, two, or more controller nodes 20 coupled to these storage nodes 30.

These controller nodes 20 and storage nodes 30 can be built as general-purpose computers, however more frequently they are physically adapted for arrangement in large data centers, where they are arranged in modular racks 40 comprising standard dimensions. Exemplary controller nodes 20 and storage nodes 30 may be dimensioned to take up a single unit of such rack 40, which is generally referred to as 1 U. Such an exemplary storage node may use a low-power processor and may be equipped with ten or twelve high capacity serial advanced technology attachment (SATA) disk drives and is connectable to the network over redundant Ethernet network interfaces. An exemplary controller node 20 may comprise high-performance servers and provide network access to applications 10 over multiple high bandwidth Ethernet network interfaces. Data can be transferred between applications 10 and such a controller node 20 by means of a variety of network protocols including hypertext transfer protocol (HTTP)/representational state transfer (REST) object interfaces, language-specific interfaces such as Microsoft .Net, Python or C, etc. Additionally, such controller nodes may comprise additional high bandwidth Ethernet ports to interface with the storage nodes 30. In some embodiments, HTTP/REST protocols complying with S3 may enable data transfer through a REST application protocol interfaces (API). Preferably, such controller nodes 20 operate as a highly available cluster of controller nodes, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
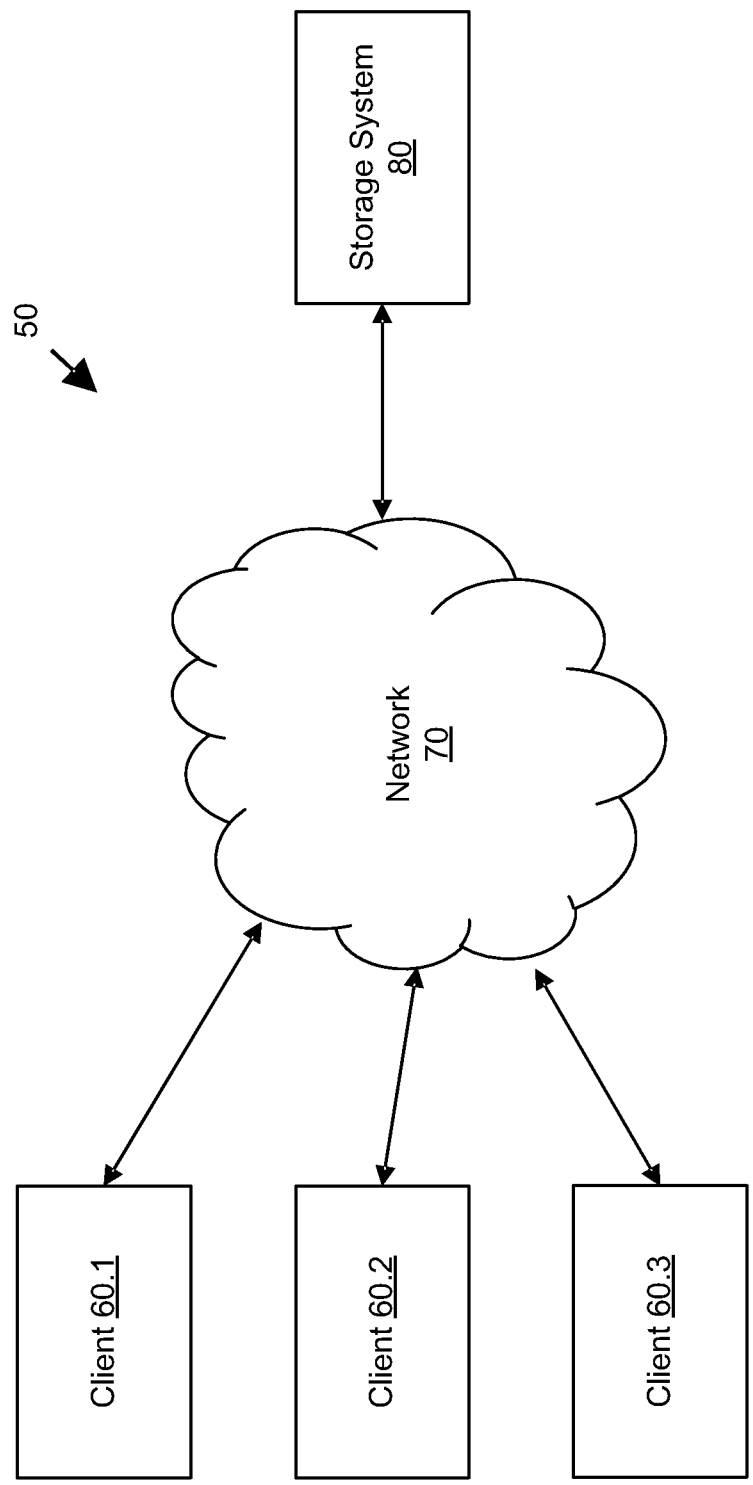
FIG. 2 schematically illustrates an example client architecture in which some embodiments of the object storage system of FIG. 1 may operate.

FIG. 2 is a block diagram of an example storage system 80 using a client architecture 50. In some embodiments, storage system 1 may be embodied in such a storage system 80. As shown, storage system 80 can include multiple client devices 60 capable of being coupled to and in communication with a storage system 80 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications, such as application 10 in FIG. 1, to use or manage a distributed object storage system, such as storage system 1 in FIG. 1.

Figure 3:
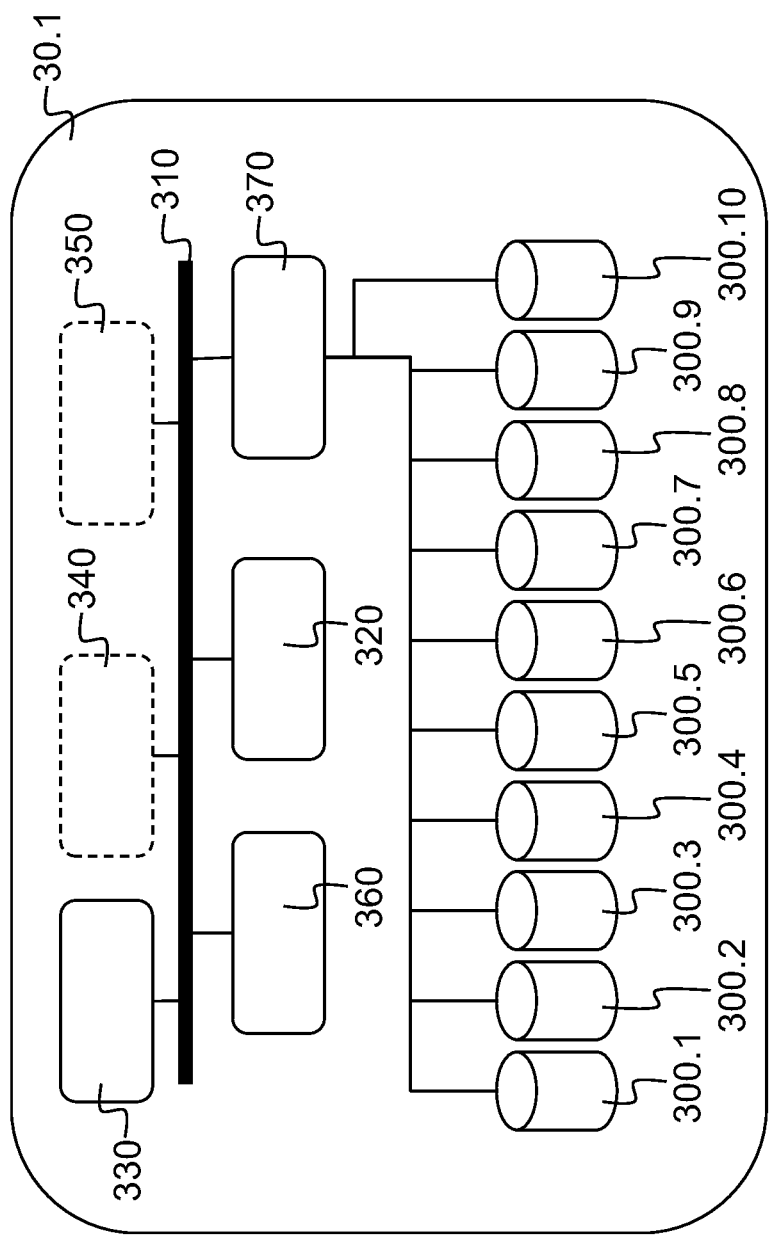
FIG. 3 schematically illustrates an example embodiment of a storage node of the object storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to storage system 1. According to the exemplary embodiment of FIG. 1 and in the event that storage nodes 30.2-30.40 are identical to storage node 30.1 and each comprise a storage capacity of 36 TB, storage system 1 would then have a total storage capacity of 1440 TB.

As is clear from FIGS. 1 and 3 storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the object storage system. Each of the storage nodes 30 may comprise a share of these storage elements 300.

As shown in FIG. 3 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Storing the data offered for storage by the application 10 in the form of a data object, also referred to as object storage, may have specific advantages over other storage schemes such as conventional block-based storage or conventional file-based storage.

The storage elements 300 or a portion thereof may be redundant and operate independently of one another. This means that if one particular storage element 300 fails its function it can easily be taken on by another storage element 300 in storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of storage elements 300 may allow a suitable mix of types of storage elements 300 to be used in a particular storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of storage system 1 as it allows for adding or removing storage elements 300 without imposing specific requirements to their design in correlation to other storage elements 300 already in use in storage system 1.

Figure 4:
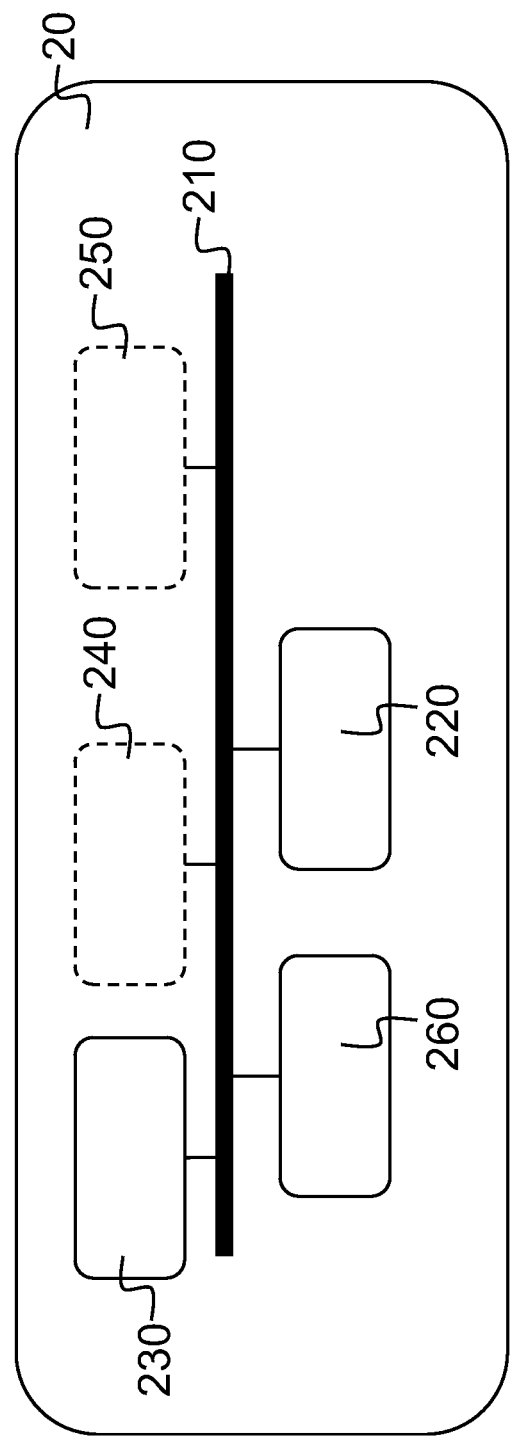
FIG. 4 schematically illustrates an example embodiment of a controller node of the object storage system of FIG. 1.

FIG. 4 shows a schematic representation of an embodiment of controller nodes 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment, controller node 20 could have an identical design as a storage node 30, or according to still a further alternative embodiment one of the storage nodes 30 of the object storage system could perform both the function of a controller node 20 and a storage node 30. According to still further embodiments, the components of the controller node 20 as described in more detail below could be distributed amongst a plurality of controller nodes 20 and/or storage nodes 30 in any suitable way. According to still a further embodiment, the device on which the application 10 runs is a controller node 20.

Figure 5:
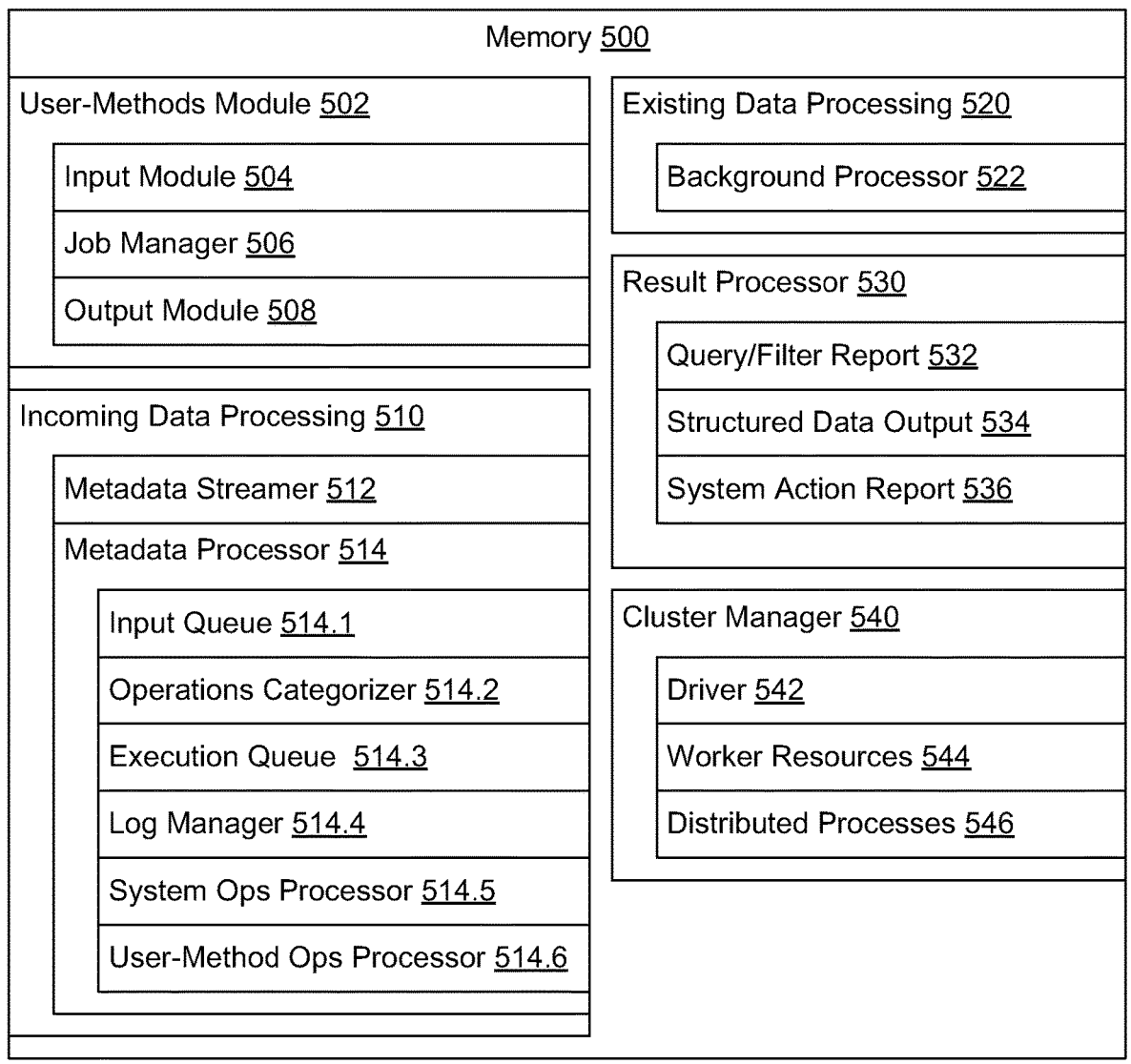
FIG. 5 schematically illustrates some example elements of an object storage system, including example configurations of the controller node of FIG. 4, in more detail.
Figure 5:
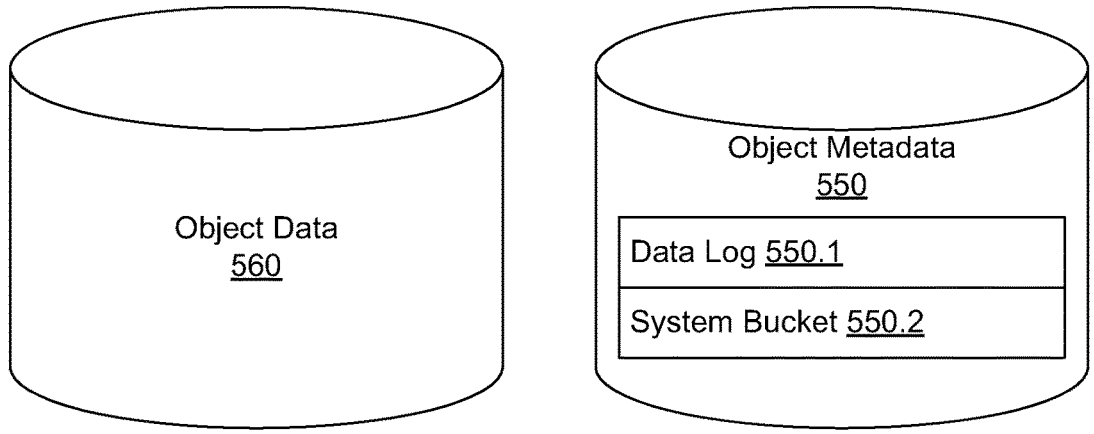

FIG. 5 schematically shows a memory 500 of an object storage system, such as storage system 1 and the elements and configurations shown in FIGS. 1-4. More specifically, memory 500 includes example components for a metadata processing function of an object storage system including object data 560 and object metadata 550. In some embodiments, memory 500 may comprise or include some portion of local memory 330 in storage nodes 30 and/or local memory 230 in controller nodes 20.

In some embodiments, memory 500 may include a user-methods module 502, an incoming data processing path 510, an existing data processing path 520, a result processor 530, and a cluster manager 540 to support metadata processing. For example, user-methods module 502 may enable a user to define user-methods to access and manipulate aggregate metadata in the object storage system without having to first export the metadata to another system. More specifically, user-methods requested through user-methods module 502 may be processed using processors 320 and/or 220 alongside normal system operations for managing and accessing object metadata 550.

A user, such as a data owner using an integrated object storage system, may be able to run a custom query and perform other actions within the object storage system on either the existing object stored or on newly written or modified objects. The user can run query, filter, map-reduce, and other user-methods, including those based on system-defined methods made available through user-methods module 502, on the objects and generate reports which can be analyzed later or exported to other applications for further processing. Available local memory and processor cycles may be used to execute these user defined methods between and around system operations.

In some embodiments, user-methods module 502 may include an input module 504, a job manager 506, and an output module 508. Input module 504 may include or support a user interface for enabling the user to define a user-method to be processed by the object storage system. For example, input module 504 may define an API for receiving user-method requests according to a defined programming syntax, data structure, or messaging protocol. In some embodiments, input module 504 may be compatible with or integrated in a data analytics application that enables the user to define queries, such as a structure query language (SQL) implementation, against the metadata structure of the object storage system. For example, a query may be defined in SQL with reference to identifiers, tables, and other data structures in object metadata 550, submitted through input module 504, and processed as further described below.

In some embodiments, input module 504 may accept user input through one or more APIs, parse the user input request, validate that it corresponds to a valid metadata operation, and forward the validated query to the job manager 506. In some embodiments, input module 504 may validate the user query and assure that it maps correctly to object metadata 550 and allowable user-methods. For example, input module 504 may place limits on the data sources, number of operations, operation types, and/or expected size of the returned data set in the query to comply with allowable processing capacity.

Input module 504 may be configured to accept user-method requests for a variety of data analytics uses, such as metadata queries, metadata filters, metadata formatting, or system-supported metadata actions. For example, a user may be able to search and report on objects with given parameters (e.g. creation date, size, prefix, bucket name, etc.), extract structured data by formatting search results in a user defined format, and/or perform limited actions on objects matching search criteria, such as count, extract a data segment (such as first X bytes of an object), etc. System-supported metadata actions may be supported by a specific object storage platform to enable more direct manipulation of objects through user-defined methods, such as delete, mark for replication, add custom headers, copy, clone, add tags, etc.

Example queries may include searching and reporting objects based on user input criteria (for all existing objects). The query input may include filter criteria, such as objects created after a specified data, objects starting with a selected prefix, objects with a size greater than X bytes, etc. The query may traverse all the object metadata and generate a result file. For example, a result file may be stored in system bucket 550.2 that contains the list of object names or GUIDs matching the criteria. A similar query may be run to search and report objects based on user input criteria for newly written objects.

Another example query type may include generating structured records from unstructured object metadata for all existing objects. The query input may include filter criteria for selecting objects, similar to those above. The query input may also include a format string or other formatting parameters used to map the data results to the desired data structure. The query may traverse all the object metadata and generate a result file formatted according to the format string. A similar query may be run to search and format the resulting data from newly written objects.

Another example query type may include searching objects based on user input criteria, then performing other system-supported actions, such as count or delete, on the resulting objects. The query may include filter criteria for selecting objects, similar to those above. The query input may also include an action string or other parameters for defining system-supported actions to be taken with regard to the identified objects. In some embodiments, input module 504 may provide a list of system-supported actions that can be embedded in queries and/or may validate the availability of any actions included in a query. The query may traverse all of the object metadata and perform the given action on objects matching the specified criteria. In some embodiments, processing the query may generate an action complete message for each object or some other result file for output to a user.

Job manager 506 may receive a validated query from input module 504 and convert the validated query into a metadata operation job to be processed by one or more metadata processors, such as metadata processor 514 or background processor 522. In some embodiments, job manager 506 may include a user-method categorizer to determine which processing path will handle processing of the user-method operation(s) from the query, such as incoming data processing path 510 or existing data processing path 520.

For example, job manager 506 may receive a query directed to the accumulated data already stored in the object storage system. For a query against existing data, job manager 506 may parse the query into a background processor job with an appropriate syntax for that processing path. For example, the resulting metadata operation may run the query or other actions to support the user-method on all target objects in the system by traversing through the metadata for the stored objects.

In another example, job manager 506 may receive a query directed to only newly written or modified objects as such change events occur. For a query against metadata changes, job manager 506 may parse the query into a metadata processor job responsive to metadata streamer 512, using appropriate syntax for that processing path. For example, the resulting metadata operation may run the query or other actions to support the user-method on every new object owned by the user who submitted the query. In some embodiments, the query may define how often reports or other output from the query are generated and stored or forwarded to the user. In some embodiments, a single user-method query may correspond to a plurality of metadata operations and job manager 506 may generate multiple jobs from a single query. For example, an analytic query may include a metadata operation to count objects with specified parameters in the existing object data and to update those counts for each newly created object.

Output module 508 may receive query results from the metadata processing paths and format, store, forward, and/or otherwise handle the resulting data for output to the user. For example, output module 508 may receive output data from a result processor 530 that receives query output and stores it in a system metadata bucket or other location specified in the query. In some embodiments, output module 508 may format the query results for display to the user directly through a user interface or through a data transfer or API to access the results through a data analytics application or other user application. In some embodiments, output module 508 may aggregate the results of multiple queries and/or periodic results (such as those generated in response to change events) for output to or access by the user. In some embodiments, output module 508 may include a user interface for managing query results stored in a system metadata bucket, such as system bucket 550.2, and provide data management actions to access, navigate, visualize, filter, and/or further process query results.

Incoming data processing path 510 may be one of the metadata processing paths available to user-methods module 502 and job manager 506. In some embodiments, incoming data processing path 510 may be selected by a user-method categorizer in job manager 506 that determines the user-method involves monitoring change events in the object data, such as newly created data objects. In some embodiments, incoming data processing path 510 includes a metadata streamer 512 and a metadata processor 514. Note that incoming data processing path 510 may support processing of system operations to object metadata 550 in response to change events, in addition to supporting user-method operations.

Metadata streamer 512 may monitor new activity happening in the object storage system to identify change events. For example, metadata streamer 512 may identify change events as they occur and selectively forward them to metadata processor 514. In some embodiments, change events may include new object requests from a user application, inline garbage collection, object replication, and any asynchronous object management activities. In some embodiments, metadata streamer 512 may be configured to replay metadata database logs and forward any changes to subsystems responsive to object changes, such as metadata processor 514.

Metadata processor 514 may receive change events for processing metadata operations, including both system operations and user-method operations. For example, metadata processor 514 may be a consumer of the change event entries generated by metadata streamer 512 and may handle all metadata operations targeting newly written objects. In some embodiments, metadata processor 514 may include an input queue 514.1, an operations categorizer 514.2, an execution queue 514.3, a log manager 514.4, a system operations processor 514.5, and a user-method operations processor 514.6.

In some embodiments, input queue 514.1 receives metadata operations triggered by change events from metadata streamer 512. For example, replayed metadata log entries may sent to input queue 514.1 and compared against criteria for active metadata operation conditions, including system operations and user-method operations. In some embodiments, input queue 514.1 may receive change event entries in real-time for processing in a first-in-first-out order by metadata processor 514.

In some embodiments, operations categorizer 514.2 may read the change event entry on the top of input queue 514.1 (oldest entry in the queue) to determine whether it is change event entry has a system operation and/or user-method operation associated with it. If a system operation is associated with change event entry, then the corresponding system operation based on the change event is added to execution queue 514.3. If a user-method operation is associated with the change event entry, then the corresponding user-method operation based on the change event is sent to log manager 514.4 for storage in data log 550.1. In some embodiments, change event entries and/or corresponding metadata operations may include a flag or similar parameter for identifying system operations and user-method operations and operations categorizer 514.2 may read the flag to determine whether to add them to execution queue 514.3 or data log 550.1. In some embodiments, a single change event entry may correspond to multiple metadata operations. For example, a change event entry may trigger both a system operation and a user-method operation.

In some embodiments, execution queue 514.3 may be a list of metadata operations awaiting processing. For example, metadata processor 514 may include system operations processor 514.5 and user-method operation processor 514.6 and each processor may use the same compute resources (e.g. processor and memory). Execution queue 514.3 may organize the priority of metadata operations to be processed. For example, system operation processor 514.5 may be configured to check execution queue 514.3 for a system operation in need of processing and user-method operations processor 514.6 may check the execution queue 514.3 for a user-method operation only if no system operations are present. In some embodiments, user-method operations processor 514.6 may detect when execution queue 514.3 is empty and signal log manager 514.4 to move a user-method operation entry from data log 550.1 to execution queue 514.3 for processing by user-method operations processor 514.6.

In some embodiments, log manager 514.4 may be include a data access method for accessing and managing entries in data log 550.1. For example, log manager 514.4 may selectively write user-method operation entries to data log 550.1 when they are received by metadata processor 514 and to read corresponding entries on a first-in-first-out basis when execution queue 514.3 is empty. In some embodiments, log manager 514.4 may monitor execution queue 514.3 for instances when no metadata operations and/or no system operations are present for processing and add a user-method operation from data log 550.1 to execution queue 514.3.

In some embodiments, system operations processor 514.5 may be configured to execute system operations and user-method operations processor 514.6 may be configured to execute user-method operations. For example, system operations processor 514.5 may be configured to execute logic corresponding to system operation methods, parameters, functions, and actions and user-method operations processor 514.6 may be configured to execute logic corresponding to user-method operation methods, parameters, functions, and actions. In some embodiments, system operation processor 514.5 and user-method operations processor 514.6 share the same compute resources, such as the local processors and memory of controller nodes, storage nodes, or other systems handling processing for the object storage system. In some embodiments, cluster manager 540 may provide distributed processing for some or all of the metadata operations handled by system operations processor 514.5 and/or user-method operations processor 514.6.

Existing data processing path 520 may include a background processor 522 configured to process metadata operations for previously stored objects. For example, background processor 522 may be responsible for scanning object metadata and performing background activity like capacity counting, garbage collection, and other system operations. In some embodiments, background processor 522 may be configured to receive user-method operation jobs from job manager 506 and report results to result processor 530 for such jobs. In some embodiments, cluster manager 540 may provide distributed processing for some or all of the metadata operations handled by background processor 522.

Result processor 530 may receive the results of metadata operations processed by metadata processor 514 and/or background processor 522. For example, metadata processor 514 may generate data output files or streams that are received by result processor 530 in response to metadata operations based on change events. Result processor 530 may receive query results as a single batch for a completed query or on a periodic basis for metadata operations processed over time or in response to ongoing change events. In some embodiments, result processor 530 may store results in a results file written to a designated storage location, such as system bucket 550.2. In addition to result output, result processor 530 may include data regarding the operations themselves, such as timestamps, processing resources (processor/memory use), target bucket(s), user information, etc.

In some embodiments, result processor 530 may be configured to identify different types of queries and/or different output formats requested in a query and format the results accordingly. For example, result processor 530 may generate a query/filter report 532 that provides a list of data objects based on query or filter criteria. In some embodiments, query/filter report 532 may comprise a list of object names or GUIDs. Query/filter report 532 may include additional data related to the data object for each data object returned based on a selected output template and/or specifically related to the query/filter criteria.

In another example, result processor 530 may generate a structured data output 534 that provides a list of data objects (or portions or parameters of data objects) based on query or filter criteria, but further formats the list of data objects into a structured data format specified in the query. For example, a format string may define a file or other data structure with fields or parameters organized according to the format string for each data object returned in the search.

In another example, result processor 530 may generate a system action report 536 that provides a status confirmation of actions taken based on one or more user-method operations. In some embodiments, system action report 536 may include a status complete message identifying the action taken and the data object or objects that the action was taken against. For example, system action report 536 may include a list of actions taken against objects with a completion status. System action report 536 may be generated at the end of a processing batch or added to sequentially on a periodic basis for repeated and/or ongoing change event processes.

Cluster manager 540 may include a cluster computing framework to run distributed computations across a plurality of compute resources, such as the controller nodes and/or storage nodes of an object storage system. In some embodiments, cluster manager 540 may be implemented in an object storage system to distribute system processing operations across the available compute resources. Metadata operations, including user-method operations, may be configured to utilize cluster manager 540. For example, at least one compute resource may be configured as driver 542 and the remaining compute resources (processor/memory nodes) may be configured as worker resources 544. Cluster manager 540 may be configured to manage the allocation of distributed processes 546, comprising resource intensive processes that may be divided and load balanced across cluster resources. In some embodiments, some or all of system operations processor 514.5, user-method operations processor 514.6, and background processor 522 may be supported by cluster manager 540 such that distributed processes 546 may include metadata operations.

Figure 6:
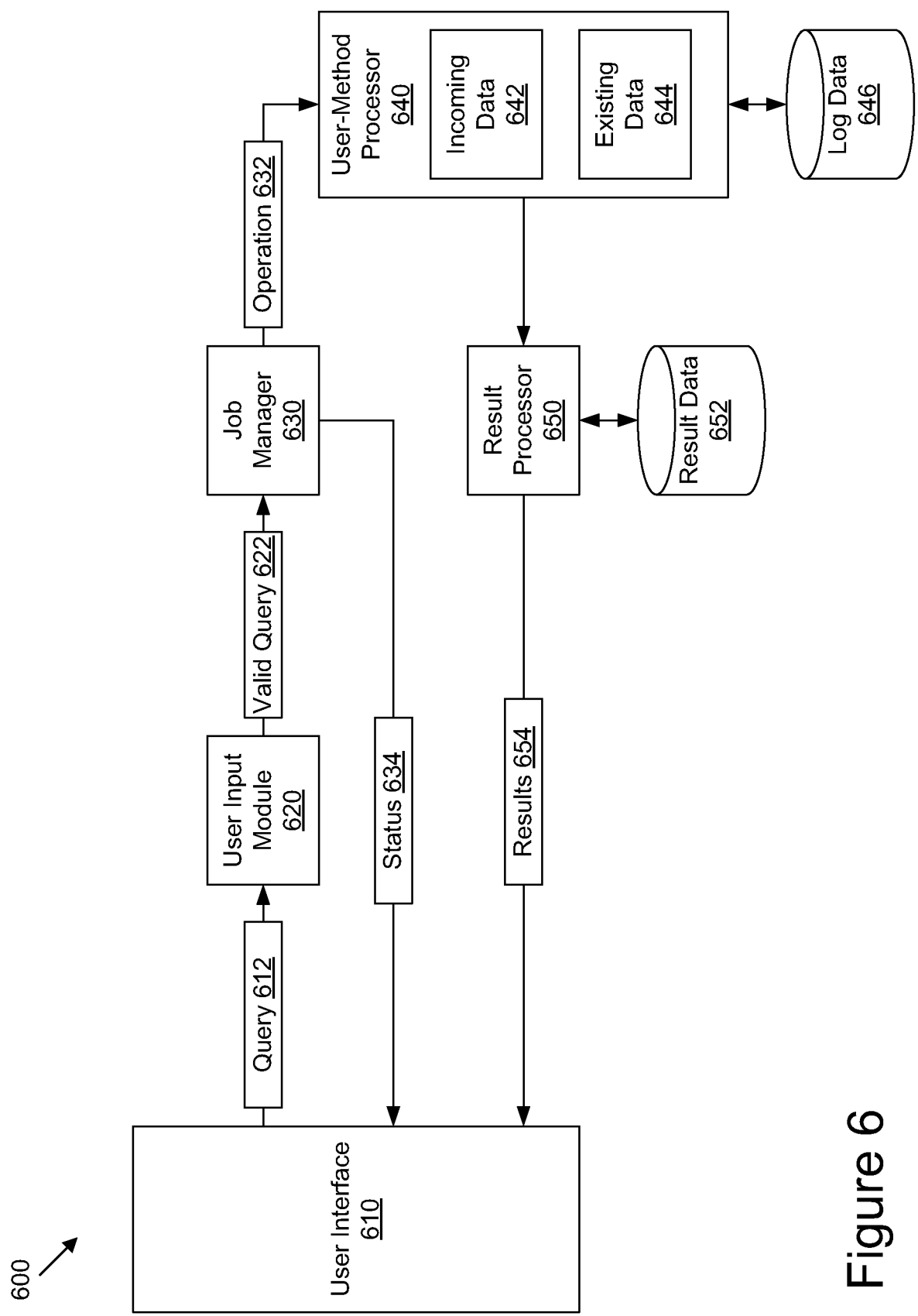
FIG. 6 schematically illustrates an example embodiment of user-method processing in an object storage system.

Referring to FIG. 6, an example user-method processing system 600 is shown. For example, user-method processing system 600 may be implemented using the object storage systems shown and described with regard to FIGS. 1-5 above. A user interface 610 may allow a user to input a user-method query 612, such as through a graphical user interface for creating SQL queries in compliance with the input criteria or parameters of system 600. User-method query 612 may be received in a message or through an API or one or more input devices by user input module 620. In some embodiments, user input module 620 may operate similarly to input module 504 in FIG. 5.

User input module 620 may validate user-method query 612 against syntax, parameters, and available metadata and system actions supported by system 600. For example, user input module 620 may parse the received query and compare the requested target data, operations, and arguments to assure compliance with available user-method operations and may return an error message for non-compliant queries. Valid query 622 may be forwarded by user input module 620 to job manager 630 to parse into one or more metadata operations 632.

In some embodiments, job manager 630 may operate similarly to job manager 506 in FIG. 5. Job manager 630 may generate metadata operation 632 from valid query 622 and direct it to user-method processor 640. In addition, job manager 630 may communicate one or more status messages 634 to user interface 610 regarding user-method query 612 and/or metadata operation 632.

In some embodiments, user-method processor 640 may include multiple processing paths for metadata operation 632. For example, user-method processor 640 may include an incoming data path 642 and an existing data path 644. In some embodiments, incoming data path 642 may operate similarly to incoming data processing path 510 in FIG. 5 and existing data path 644 may operate similarly to existing data processing path 520 in FIG. 5. In some embodiments, user-method processor 640 may use log data 646 for storing and delaying the processing of user-method operation until no system operations need to be processed, at which time user-method operation may be processed to generate results.

In some embodiments, result processor 650 may receive data output returned by user-method processor 640 and store them in result data 652. For example, result data 652 may be stored in a system bucket accessible to the user who requested user-method query 612. Results 654 may then be provided back to the user, such as through user interface 610. For example, results processor 650 may be configured to push results 654 to user interface 610 or user interface 610 may enable a user to access results 654 from result data 652. Thus, a data object analytics query entered through user interface 610 may be processed by system 600 with a lower priority than system operations and the results returned back through user interface 610 when the processing is complete.

Figure 7:
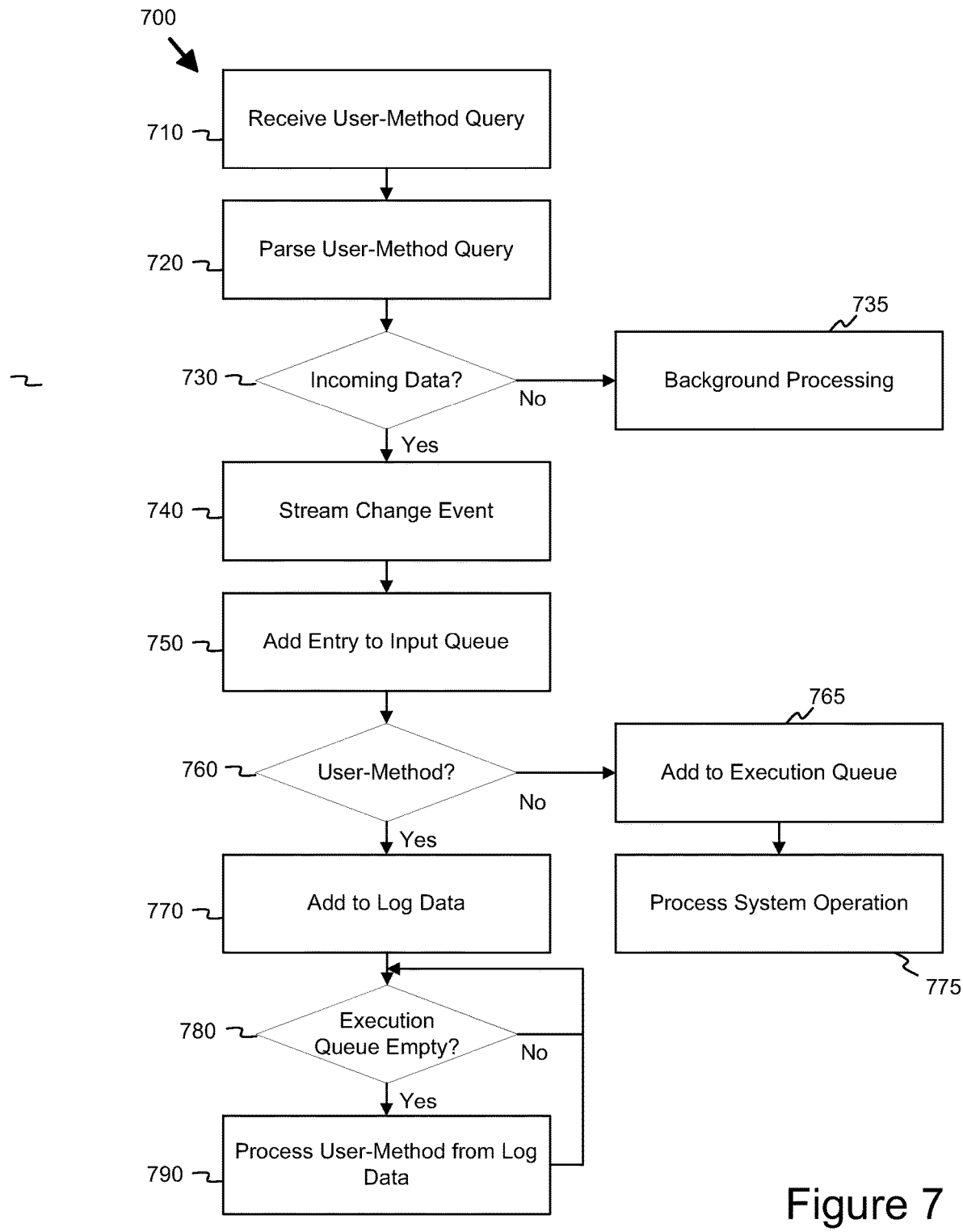
FIG. 7 illustrates an example method of user-method processing in an object storage system.

Referring to FIG. 7, storage system 1 and its components, as described with regard to FIGS. 1-6 above, may be operated according to a priority metadata processing method, i.e. according to the method 700 illustrated by blocks 710-790 in FIG. 7.

At block 710, a user-method query may be received by a computer system. For example, a user may formulate a query using SQL and submit it through a data analytics interface for an object storage system.

At block 720, the user-method query may be parsed by the computer system. For example, the computer system may validate the user-method query according to the data, parameters, operations, and actions available for metadata queries on the system. The query may then be parsed into one or more metadata operations for processing by the computer system.

At block 730, the resulting metadata operation may be evaluated by the computer system to determine whether it relates to incoming data or not. If it does not target incoming data, it may target existing data and be forwarded for background processing at block 735. If it does target incoming data, it may be forwarded to metadata handling for incoming data or data change events.

At block 740, the computer system may stream change events that may relate to metadata operations that target incoming data. For example, both user-method operations and system operations may be forwarded to a metadata processor in response to metadata change events being replayed from one or more metadata database logs.

At block 750, the computer system may add a metadata operation entry to an input queue for each metadata operation triggered by a change event. For example, the metadata processor may parse metadata change events against metadata operation trigger criteria to determine what metadata operation entries to add to the input queue.

At block 760, the computer system may categorize metadata operations as system operations or user-method operations. If the metadata operation in the input queue is not a user-method operation, it may be a system operation and is immediately give priority and added to the execution queue at block 765. System operations are processed from the execution queue at block 775 as long as there are system operations available in the execution queue.

If the metadata operation in the input queue is a user-method operation, it may be added to the log data at block 770. For example, each user-method operation may initially be written to log data with a lower or secondary priority to assure that system operations are given preferential processing.

At block 780, the computer system checks to see whether the execution queue is empty. If not, it may keep rechecking. If the execution queue is empty, then a user-method operation may be processed from the log data at block 790. For example, when there are no system operations in the execution queue, a user-method operation may be selected from the log data in first-in-first-out order for processing by the computer system. Method 700 may return to block 780 to recheck the execution queue after the user-method operation has been processed, but may also be receiving additional entries in the input queue from new change events at blocks 740 and 750 (as well as possibly receiving entirely new user-method queries at block 710).

Figure 8:
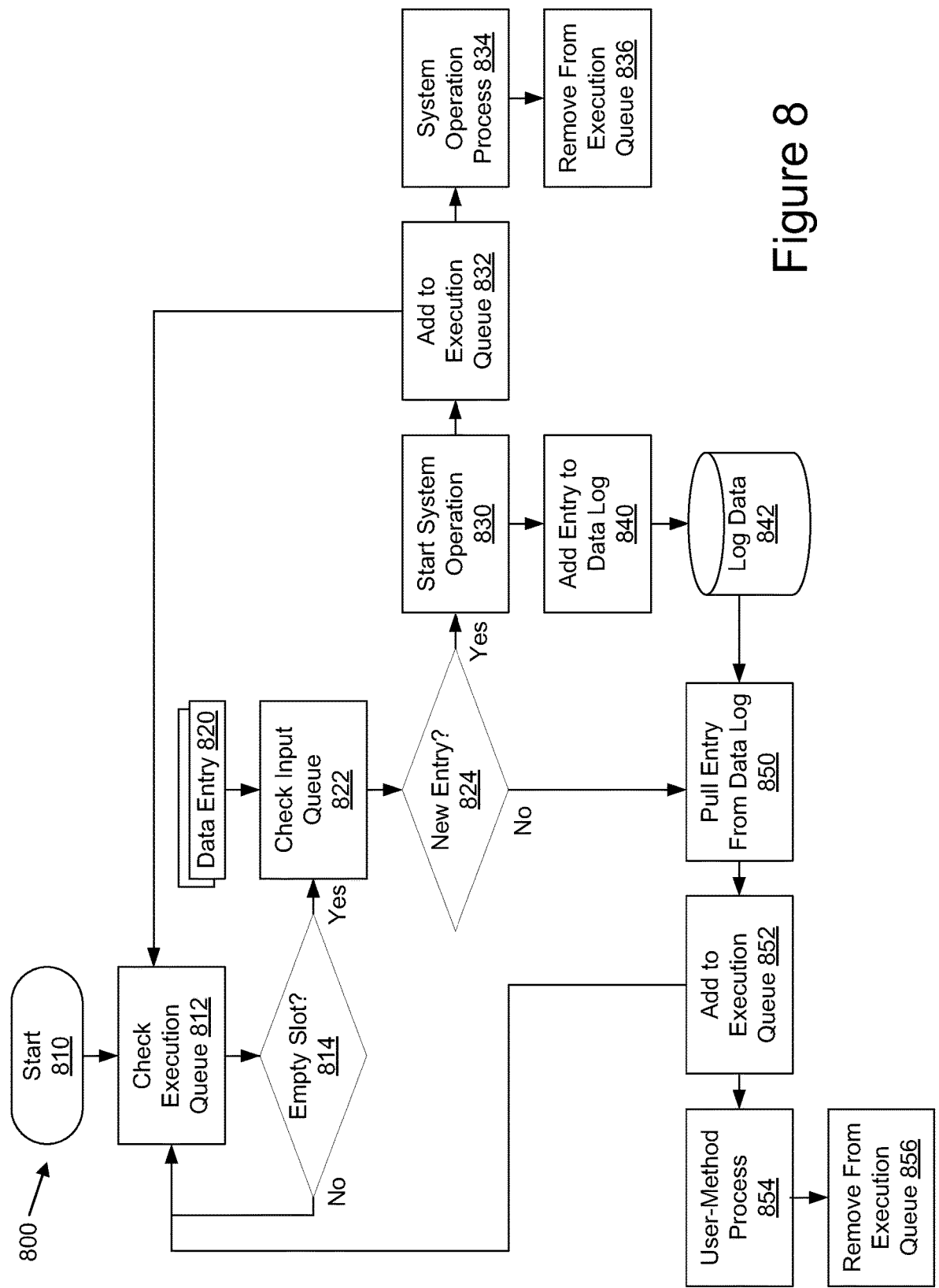
FIG. 8 illustrates an example method of priority metadata processing in an object storage system.

Referring to FIG. 8, storage system 1 and its components, as described with regard to FIGS. 1-6 above, may be operated according to a priority metadata processing method, i.e. according to the method 800 illustrated by blocks 810-856 in FIG. 8. For example, a metadata processor may give highest priority to system operations and lower priority to user-method operations. System operations may be processed with a first priority that handles system operations as soon as possible according to a first-in-first-out processing scheme and/or a system operations priority scheme implemented at the system level for prioritizing one system operation over another system operation. User-method operations may have a second priority that handles user-method operations on a "best effort" approach when processing resources are not otherwise engaged in system operations.

At block 810, method 800 may be started when processing resources are allocated to metadata processing. For example, a local processor may have a defined allocation and/or priority level for handling metadata processing. In some embodiments, allocation of metadata processing may be handled on a cluster level and a driver may allocate a worker resource (which may or may not be the processor in the compute node closest to the relevant object metadata tables) to distributed processing of metadata operations.

At block 812, an execution queue for the metadata operations may be checked for availability. At block 814, an empty slot in the execution slot may be identified. If it is, an input queue for the metadata processor is checked at block 822. If not, method 800 continues to check the execution queue until there is an empty slot.

At block 822, the input queue is checked for metadata operations created in response to a change event, such as data entries 820. At block 824, a new entry may be identified. If unprocessed data entries 820 are in the input queue, any system operations based on the new entry may be started at block 830. Only if no unprocessed data entries 820 are available to use the empty slot in the execution queue will method 800 proceed to block 850.

At block 832, once a system operation is started, the system operation will be added to the execution queue and occupy an execution slot until it is complete. In some embodiments, metadata processing may have only a single execution slot and the presence of the system operation will prevent both the evaluation of new data entries and the processing of user-methods from log data. On other embodiments, the execution queue will include multiple active slots and new entries and/or user-methods may be selected until all slots are full per the other blocks in method 800.

At block 834, the system operation may be processed using the available compute resources. Upon completion of processing, at block 836, the completed system operation may be removed from the execution queue and free up a slot to be identified in blocks 812 and 814.

At block 840, a user-method operation entry may be added to log data 842. In some embodiments, any user-method triggered by the new entry from the input queue may be added to the data log (at block 840) in parallel with adding any system operations to the execution queue (at block 832).

At block 850, an empty slot has been identified in the execution queue at block 814 and no new entry is available for processing from the input queue at block 824. Only then is a user-method operation entry pulled from log data 842 for processing. The user-method operation may be added to the execution queue at block 852.

At block 854, the user-method operation may be processed using the available compute resources. Upon completion of processing, at block 856, the completed user-method operation may be removed from the execution queue and free up a slot to be identified in blocks 812 and 814.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
   at least one processor;
   at least one memory coupled to the at least one processor; and
   a metadata processor configured to:
     receive metadata operations related to change events for at least one data object stored in a plurality of storage nodes configured to receive and store data objects, wherein the metadata operations include:
       system operations configured to manage changes to the data objects stored in the plurality of storage nodes; and
       user-method operations configured to execute user-defined methods using the data objects stored in the plurality of storage nodes;
     selectively forward the system operations to an execution queue;
     selectively forward the user-method operations to a data log;
     execute, responsive to the system operations being available for processing in the execution queue, the system operations;
     selectively add, responsive to no system operations being available for processing in the execution queue, the user-method operations to the execution queue; and execute, responsive to the user-method operations being available for processing in the execution queue, the user-method operations.

2. The system of claim 1, further comprising:
a system operations processor configured to process the system operations from the execution queue.

3. The system of claim 1, further comprising:
a user-method operations processor configured to process, responsive to adding the user-method operations to the execution queue, the user-method operations from the data log.

4. The system of claim 1, further comprising:
a metadata streamer stored in the at least one memory for execution by the at least one processor and configured to:
identify the change events related to the data objects stored in the plurality of storage nodes; and
forward the metadata operations to an input queue of the metadata processor; and
an operations categorizer stored in the at least one memory for execution by the at least one processor and configured to:
identify the system operations and the user-method operations from the metadata operations in the input queue;
selectively forward, for the metadata processor, the system operations to the execution queue; and
selectively forward, for the metadata processor, the user-method operations to the data log.

5. The system of claim 1, further comprising:
a user input module stored in the at least one memory for execution by the at least one processor and configured to:
receive a user-defined method request; and
parse the user-defined method request into at least one user-method operation; and
a job manager stored in the at least one memory for execution by the at least one processor and configured to submit the at least one user-method operation from the user input module to the metadata processor.

6. The system of claim 1, wherein:
the system operations include operations related to user application access to the data objects stored in the plurality of storage nodes from at least one production user application; and
the user-method operations include metadata queries configured to generate reports related to aggregate features of the data objects stored in the plurality of storage nodes.

7. The system of claim 1, wherein:
the user-method operations include at least one of metadata queries, metadata filters, metadata formatting, or system-supported metadata actions;
a user selects the user-method operations for processing outside of operations related to user application access to data objects; and
the metadata processor is further configured to store results of the user-method operations in a system metadata repository.

8. The system of claim 1, wherein the metadata processor is further configured to execute the metadata operations in the execution queue in a sequential first-in-first-out order.

9. The system of claim 8, wherein the metadata processor is further configured to selectively add the user-method operations to the execution queue from the data log in response to the execution queue being empty.

10. A computer-implemented method, comprising:
receiving metadata operations in response to change events for at least one data object stored in a plurality of storage nodes, wherein the metadata operations include:
system operations configured to manage changes to data objects in the plurality of storage nodes; and
user-method operations configured to execute user-defined methods using the data objects in the plurality of storage nodes;
selectively forwarding the system operations to an execution queue;
selectively forwarding the user-method operations to a data log;
executing, responsive to the system operations being available for processing in the execution queue, the system operations;
selectively adding, responsive to no system operations being available for processing in the execution queue, the user-method operations to the execution queue; and
executing, responsive to the user-method operations being available for processing in the execution queue, the user-method operations.

11. The computer-implemented method of claim 10, further comprising:
selecting new entries for the system operations from an input queue; and
sending, from the execution queue, the selected new entries to a system operations processor configured to process the system operations.

12. The computer-implemented method of claim 10, further comprising:
selecting log entries from the data log in response to an input queue being empty; and
sending, from the execution queue, the selected log entries to a user-method operations processor configured to process the user-method operations from the data log.

13. The computer-implemented method of claim 10, further comprising:
identifying change events related to the data objects stored in the plurality of storage nodes;
forwarding, responsive to the identified change events, the metadata operations to an input queue of a metadata processor; and
identifying the system operations and the user-method operations from the metadata operations in the input queue.

14. The computer-implemented method of claim 10, wherein executing the metadata operations in the execution queue is in a sequential first-in-first-out order.

15. The computer-implemented method of claim 14, wherein selectively adding the user-method operations to the execution queue from the data log is in response to the execution queue being empty.

16. The computer-implemented method of claim 10, further comprising:
receiving a user-defined method request;
parsing the user-defined method request into at least one user-method operation; and
submitting the at least one user-method operation to a metadata processor.

17. The computer-implemented method of claim 10, wherein:
- the system operations include operations related to user application access to the data objects in the plurality of storage nodes from at least one production user application; and
- the user-method operations include metadata queries configured to generate reports related to aggregate features of the data objects in the plurality of storage nodes.

18. The computer-implemented method of claim 10, wherein the user-method operations include at least one of metadata queries, metadata filters, metadata formatting, or system-supported metadata actions; and further comprising:
- selecting by a user the user-method operations for processing outside of operations related to user application access to data objects; and
- storing results of the user-method operations in a system metadata repository.

19. A system, comprising:
- at least one processor;
- at least one memory coupled to the at least one processor;
- means, stored in the at least one memory for execution by the at least one processor, for receiving metadata operations in response to change events for at least one data object stored in a plurality of storage nodes configured to receive and store data objects, wherein the metadata operations include:
  - system operations configured to manage changes to data objects in the plurality of storage nodes; and
  - user-method operations configured to execute user-defined methods using the data objects in the plurality of storage nodes;
- means, stored in the at least one memory for execution by the at least one processor, for selectively forwarding the system operations to an execution queue;
- means, stored in the at least one memory for execution by the at least one processor, for selectively forwarding the user-method operations to a data log;
- means, stored in the at least one memory for execution by the at least one processor, for executing, responsive to the system operations being available for processing in the execution queue, the system operations;
- means, stored in the at least one memory for execution by the at least one processor, for selectively adding, responsive to no system operations being available for processing in the execution queue, the user-method operations to the execution queue; and
- means, stored in the at least one memory for execution by the at least one processor, for executing, responsive to the user-method operations being available for processing in the execution queue, the user-method operations.

20. The system of claim 19, further comprising:
- means, stored in the at least one memory for execution by the at least one processor, for identifying change events related to the data objects in the plurality of storage nodes;
- means, stored in the at least one memory for execution by the at least one processor, for forwarding, responsive to the identified change events, the metadata operations to an input queue of a metadata processor; and
- means, stored in the at least one memory for execution by the at least one processor, for identifying the system operations and the user-method operations from the metadata operations in the input queue.

* * * * *